United States Patent
Sun et al.

(10) Patent No.: US 11,568,306 B2
(45) Date of Patent: Jan. 31, 2023

(54) DATA PRIVACY PROTECTED MACHINE LEARNING SYSTEMS

(71) Applicant: salesforce.com, inc., San Francisco, CA (US)

(72) Inventors: Lichao Sun, Palo Alto, CA (US); Caiming Xiong, Mountain View, CA (US); Jia Li, Mountain View, CA (US); Richard Socher, Menlo Park, CA (US)

(73) Assignee: Salesforce.com, Inc., San Francisco, CA (US)

( * ) Notice: Subject to any disclaimer, the term of this patent is extended or adjusted under 35 U.S.C. 154(b) by 946 days.

(21) Appl. No.: 16/398,757

(22) Filed: Apr. 30, 2019

(65) Prior Publication Data

US 2020/0272940 A1 Aug. 27, 2020

Related U.S. Application Data

(60) Provisional application No. 62/810,843, filed on Feb. 26, 2019, provisional application No. 62/810,345, filed on Feb. 25, 2019.

(51) Int. Cl.
*G06K 9/62* (2022.01)
*G06N 20/00* (2019.01)
*G06F 21/62* (2013.01)
*G06N 3/08* (2006.01)

(52) U.S. Cl.
CPC .......... *G06N 20/00* (2019.01); *G06F 21/6254* (2013.01); *G06K 9/6256* (2013.01); *G06K 9/6267* (2013.01); *G06N 3/084* (2013.01)

(58) Field of Classification Search
CPC .......... G06N 3/084; G06N 20/00; G06N 3/08; G06K 9/6256; G06K 9/6267; G06K 9/628; G06F 21/6245; G06F 30/27
See application file for complete search history.

(56) References Cited

U.S. PATENT DOCUMENTS 10,282,663 B2   5/2019   Socher et al.
10,346,721 B2   7/2019   Albright et al.
2016/0350653 A1   12/2016   Socher et al.
(Continued)

OTHER PUBLICATIONS

Abadi et al., "Deep Learning with Differential Privacy," Proceedings of the 2016 ACM SIGSAC Conference on Computer and Communications Security, pp. 1-14, 2016 2016.
(Continued)

*Primary Examiner* — Tuan H Nguyen
(74) *Attorney, Agent, or Firm* — Haynes and Boone LLP

(57) ABSTRACT

Approaches for private and interpretable machine learning systems include a system for processing a query. The system includes one or more teacher modules for receiving a query and generating a respective output, one or more privacy sanitization modules for privacy sanitizing the respective output of each of the one or more teacher modules, and a student module for receiving a query and the privacy sanitized respective output of each of the one or more teacher modules and generating a result. Each of the one or more teacher modules is trained using a respective private data set. The student module is trained using a public data set. In some embodiments, human understandable interpretations of an output from the student module is provided to a model user.

20 Claims, 12 Drawing Sheets

(56) References Cited

U.S. PATENT DOCUMENTS

| | | | |
|---|---|---|---|
| 2017/0024645 A1 | 1/2017 | Socher et al. | |
| 2017/0032280 A1 | 2/2017 | Socher et al. | |
| 2017/0140240 A1 | 5/2017 | Socher et al. | |
| 2018/0082171 A1 | 3/2018 | Merity et al. | |
| 2018/0096219 A1 | 4/2018 | Socher et al. | |
| 2018/0096267 A1 | 4/2018 | Masekara et al. | |
| 2018/0101768 A1 | 4/2018 | Laine et al. | |
| 2018/0121787 A1 | 5/2018 | Hashimoto et al. | |
| 2018/0121788 A1 | 5/2018 | Hashimoto et al. | |
| 2018/0121799 A1 | 5/2018 | Hashimoto et al. | |
| 2018/0129931 A1 | 5/2018 | Bradbury et al. | |
| 2018/0129937 A1 | 5/2018 | Bradbury et al. | |
| 2018/0129938 A1 | 5/2018 | Xiong et al. | |
| 2018/0143966 A1 | 5/2018 | Lu et al. | |
| 2018/0144208 A1 | 5/2018 | Lu et al. | |
| 2018/0144248 A1 | 5/2018 | Lu et al. | |
| 2018/0268287 A1 | 9/2018 | Johansen et al. | |
| 2018/0268298 A1 | 9/2018 | Johansen et al. | |
| 2018/0300317 A1 | 10/2018 | Bradbury | |
| 2018/0300400 A1 | 10/2018 | Paulus | |
| 2018/0336198 A1 | 11/2018 | Zhong et al. | |
| 2018/0336453 A1 | 11/2018 | Merity et al. | |
| 2018/0349359 A1 | 12/2018 | McCann et al. | |
| 2018/0373682 A1 | 12/2018 | McCann et al. | |
| 2018/0373987 A1 | 12/2018 | Zhang et al. | |
| 2019/0108432 A1 | 4/2019 | Lu et al. | |
| 2019/0108439 A1 | 4/2019 | Lu et al. | |
| 2019/0130206 A1 | 5/2019 | Trott et al. | |
| 2019/0130221 A1* | 5/2019 | Bose | G06K 9/6262 |
| 2019/0130248 A1 | 5/2019 | Zhong et al. | |
| 2019/0130249 A1 | 5/2019 | Bradbury et al. | |
| 2019/0130273 A1 | 5/2019 | Keskar et al. | |
| 2019/0130312 A1 | 5/2019 | Xiong et al. | |
| 2019/0130896 A1 | 5/2019 | Zhou et al. | |
| 2019/0130897 A1 | 5/2019 | Zhou et al. | |
| 2019/0149834 A1 | 5/2019 | Zhou et al. | |
| 2019/0188568 A1 | 6/2019 | Keskar et al. | |
| 2019/0213482 A1 | 7/2019 | Socher et al. | |
| 2019/0251168 A1 | 8/2019 | McCann et al. | |
| 2019/0251431 A1 | 8/2019 | Keskar et al. | |
| 2019/0258714 A1 | 8/2019 | Zhong et al. | |
| 2019/0258901 A1 | 8/2019 | Albright et al. | |
| 2019/0258939 A1 | 8/2019 | Min et al. | |
| 2020/0175193 A1* | 6/2020 | Pesé | G06F 21/6245 |

OTHER PUBLICATIONS

Bach et al., "On Pixel-Wise Explanations for Non-Linear Classifier Decisions by Layer-Wise Relevance Propagation," PLoS ONE, 10(7): e0130140, pp. 1-46, 2015 2015.
Beimel et al., "Bounds on the Sample Complexity for Private Learning and Private Data Release," Machine Learning, 94(3):401-437, 2014 2014.
Claerhout et al., "Privacy Protection for Clinical and Genomic Data: The Use of Privacy-Enhancing Techniques in Medicine," International Journal of Medical Informatics, 74(2):257-265, 2005, pp. 1-9 2005.
Devlin et al., "BERT: Pre-training of Deep Bidirectional Transformers for Language Understanding," 2019 Annual Conference of the North American Chapter of the Association for Computational Linguistics, pp. 1-16 2018.
Dwork et al., "The Algorithmic Foundations of Differential Privacy," Foundations and Trends in Theoretical Computer Science, 2014, vol. 9(3-4), pp. 211-407 2014.
Dwork, "Differential Privacy," Encyclopedia of Cryptography and Security, 2011, pp. 338-340 2011.
He et al., "Deep Residual Learning for Image Recognition," Proceedings of the IEEE Conference on Computer Vision and Pattern Recognition, 2016, pp. 1-8 2016.
Hinton, et al., "Distilling the Knowledge in a Neural Network," Twenty-eighth Conference on Neural Information Processing Systems 2014 Deep Learning and Representation Learning Workshop, pp. 1-9 2015.
Hitaj et al., "Deep Models under the GAN: Information Leakage from Collaborative Deep Learning," Proceedings of the 2017 ACM SIGSAC Conference on Computer and Communications Security, pp. 1-16 2017.
Krizhevsky et al., "Learning Multiple Layers of Features from Tiny Images," pp. 1-60, 2009. http://citeseerx.ist.psu.edu/viewdoc/download?doi=10.1.1 222.9220&rep=rep 1&type=pdf 2009.
Laine et al., "Temporal Ensembling for Semi-Supervised Learning," Fifth International Conference on Learning Representations, 2017, pp. 1-13 2017.
Lecun et al., "Gradient-Based Learning Applied to Document Recognition," Proceedings of the IEEE, 1998, vol. 86 (11), pp. 1-46 1998.
Montavon et al., "Methods for Interpreting and Understanding Deep Neural Networks," Digital Signal Processing, 2018, vol. 73, pp. 1-15 2018.
Netzer et al., "Reading Digits in Natural Images with Unsupervised Feature Learning," Proceedings of the 24th International Conference on Neural Information Processing Systems, 2011, pp. 1-9 2011.
Papernot et al., "Semi-Supervised Knowledge Transfer for Deep Learning from Private Training Data" Fifth International Conference on Learning Representations, 2017, pp. 1-16 2017.
Papernot et al., "Scalable Private Learning with PATE," Sixth International Conference on Learning Representations, 2018, pp. 1-34 2018.
Park et al., "Adversarial Dropout for Supervised and Semi-Supervised Learning," 32nd AAAI Conference on Artificial Intelligence, 2017, pp. 3917-3924 2017.
Ribeiro et al., "Why Should I Trust You?: Explaining the Predictions of Any Classifier," Proceedings of the 22nd ACM SIGKDD International Conference on Knowledge Discovery and Mining, 2016, pp. 1-10 2016.
Romero et al., "FitNets: Hints for Thing Deep Nets," 3th International Conference on Learning Representatives, pp. 1-13, 2015. arXiv:1412.6550 2015.
Samek et al., "Explainable Artificial Intelligence: Understanding, Visualizing, and Interpreting Deep Learning Models," 2017, pp. 1-8 arXiv:1708.08296 2017.
Silver et al., "Mastering the Game of Go Without Human Knowledge," Nature, 2017, 550: 354-359, pp. 1-18 2017.
Simonyan et al., "Deep Inside Convolutional Networks: Visualising Image Classification Models and Saliency Maps," Second International Conference on Learning Representations, 2014, pp. 1-8 2013.
Triasteyn et al., "Generating Artificial Data for Private Deep Learning," pp. 1-8, 2018. arXiv: 1803.03148 2018.
Zhang et al., "Interpretable Convolutional Neural Networks," Proceedings of the IEEE Conference on Computer Vision and Patter Recognition, 2018, pp. 8827-8836 2018.

* cited by examiner

Algorithm 1: Private and Interpretable Student Model

Parameter: Teacher models $\mathcal{T}$, Hint learning epochs $T_h$; Distillation learning epochs $T_d$; Batch size $S$ of hint learning and distillation learning; threshold bound $D$.

1. for $epoch = 1$ to $T_h$ do
2.    for $i = 0$ to $|x_p|/S$ do
3.       Sample a batch $\mathbf{x}_p^{(i)}$ of size $S$ from $\mathbf{x}_p$;
4.       Compute hint loss $L_H^{(i)}$ over $\mathbf{x}_p^{(i)}$ by Eq. (7) for each teacher $\mathcal{T}$;
5.       Bound $L_H^{(i)}$ by Eq. (5) for each teacher;
6.       Compute aggregated hint loss $\hat{L}_H^{(i)}$ by averaging bounded hint loss $L_H^{(i)}$ of all teachers;
7.       Compute perturbed hint loss $\tilde{L}_H^{(i)}$ by Eq. (6);
8.       Backpropagate by $\tilde{L}_H^{(i)}$ to update $\Theta_g$ and $\Theta_a$;
9. for $epoch = 1$ to $T_d$ do
10.    for $i = 0$ to $|x_p|/S$ do
11.       Sample a batch $\mathbf{x}_p^{(i)}$ of size $S$ from $\mathbf{x}_p$;
12.       Compute knowledge distillation loss $L_K^{(i)}$ over $\mathbf{x}_p^{(i)}$ by Eq. (4) for each teacher $\mathcal{T}$;
13.       Bound $L_K^{(i)}$ by Eq. (5) for each teacher;
14.       Compute aggregated distillation loss $\hat{L}_K^{(i)}$ by averaging bounded distillation loss $L_K^{(i)}$ of all teachers;
15.       Perturb The Distillation Loss $\tilde{L}_K^{(i)}$ by Eq. (6)
16.       Backpropagate by $\tilde{L}_K^{(i)}$ to update $\Theta_s$;
17. Obtain the human understandable interpretations by Eq. (8)

*FIG. 5*

DATA PRIVACY PROTECTED MACHINE LEARNING SYSTEMS

CROSS REFERENCES

The present disclosure claims benefits of and commonly-owned U.S. provisional application Nos. 62/810,345, filed Feb. 25, 2019, and 62/810,843, filed Feb. 26, 2019, both of which are hereby expressly incorporated herein by reference in their entirety.

TECHNICAL FIELD

The present disclosure relates generally to training and use of machine learning systems and more specifically to private and interpretable machine learning systems.

BACKGROUND

The demand for intelligent applications calls for deploying powerful machine learning systems. Most existing model training processes focus on achieving better prediction results in a homogeneous environment, where each of the relevant participants are in the same party. However, in an assembly line of business-to-business (B2B) project, the participants are usually from multiple parties, e.g., data providers, model providers, model users, etc., which brings new trust concerns into consideration. For example, a new hospital may want to adopt machine learning techniques to help their doctors find better diagnostic and treatment solutions for coming patients. Due to the computation ability and data limitations, the new hospital may not be able to train their own machine learning models. A model provider may help the new hospital to train a diagnostic model based on knowledge from other hospitals. However, to protect patient privacy, the other hospitals do not permit their private data to be exposed to the new hospital.

Accordingly, it would be advantageous to have systems and methods for training and using machine learning systems that protect data privacy and honor the trust between cooperating parties.

BRIEF DESCRIPTION OF THE DRAWINGS

FIG. 5 is a diagram of an algorithm for training a private and interpretable student model via hint learning and knowledge distillation, according to some embodiments.

In the figures, elements having the same designations have the same or similar functions.

DETAILED DESCRIPTION

In view of the need for a data privacy protected machine learning system, embodiments described herein provide a private and interpretable machine learning framework that distills and perturbs knowledge from multiple private data providers to enforce privacy protection and utilizes the interpretable learning for understandable feedbacks for model users.

As used herein, the term "network" may include any hardware or software-based framework that includes any artificial intelligence network or system, neural network or system and/or any training or learning models implemented thereon or therewith.

As used herein, the term "module" may include any hardware or software-based framework that performs one or more functions. In some embodiments, the module may be implemented using one or more neural networks.

Figure 1:
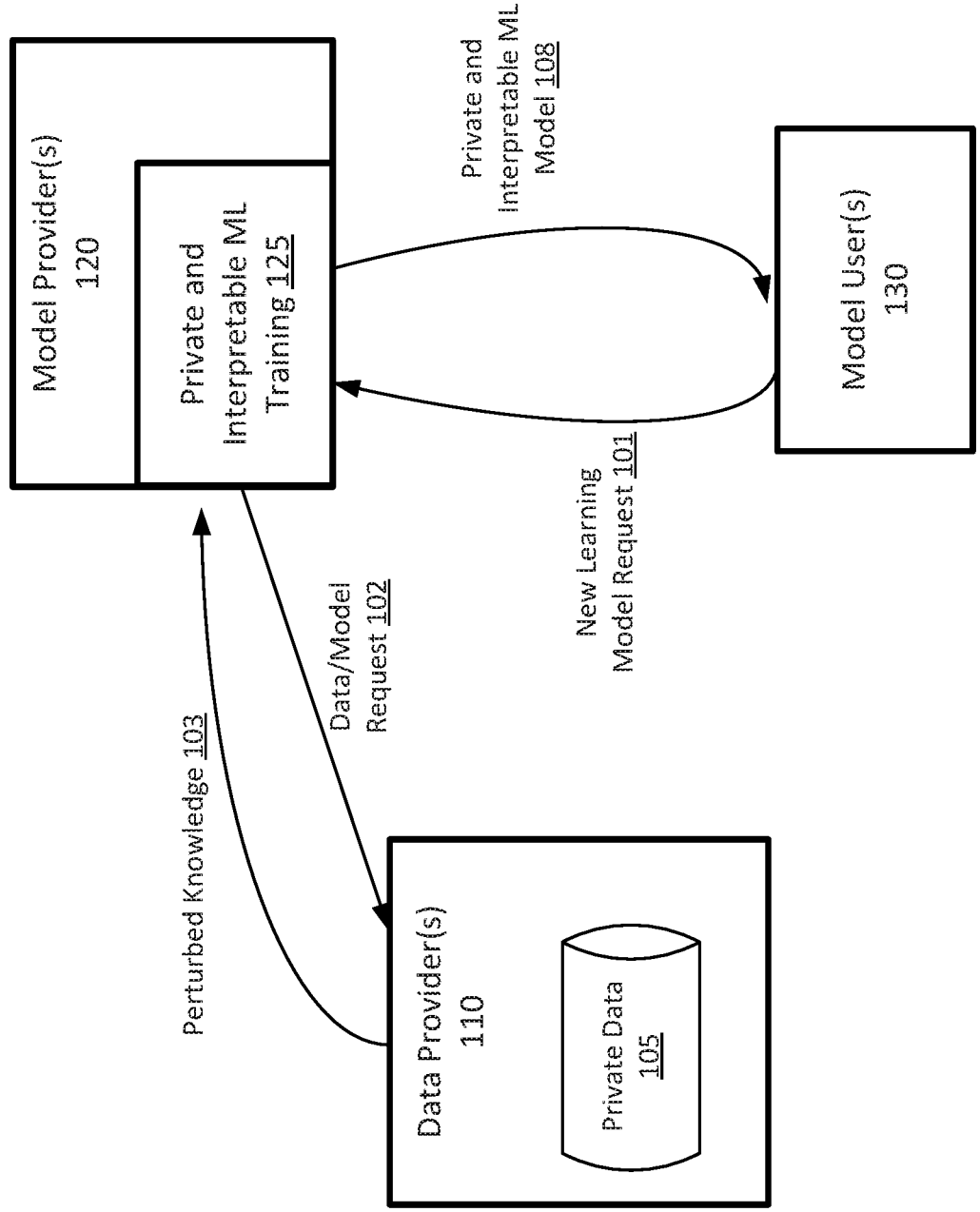
FIG. 1 is a simplified diagram illustrating data flows between different parties for data privacy protection, according to some embodiments.

FIG. 1 is a simplified diagram illustrating data flows between different parties for data privacy protection, according to some embodiments. Data provider(s) 110 (e.g., one or more hospitals), a model provider 120, and a model user 130 (e.g., a new hospital) are shown to interact with each other. In some examples, the model user 130 may send a new learning model request 101 to the model provider 120, e.g., for a new diagnostic model for the new hospital. The model provider 120 may operate a private and interpretable machine learning training framework 125, which sends a data or model training request 102 to the data provider(s) 110.

In some examples, each data provider 110 has trained a teacher module by using its own private data 105, and thus does not permit any knowledge of the teacher module to be shared with the model user 130, e.g., to train the student module for the model user. In this case, public data is used to train the student module for the model user with a comparable performance with those teacher modules. Specifically, queries from unlabeled public data is fed to the teacher modules to generate responses. Such responses that carry knowledges of the teacher modules are not shared with the student module directly. Instead, only perturbed knowledge 103 from the teacher modules are used to update the student module.

In some examples, when the data provider 110 does not trust the model provider 120, the data provider(s) 110 may perturb the outputs from the teacher modules and send the perturbed outputs (e.g., perturbed knowledge 103) to the model provider 120 for student module training. In some examples, if the model provider 120 is an entrusted party to the data provider(s) 110, the model provider 120 may receive and perturb the knowledge from the teacher modules of the data providers 110. In any case, the private and interpretable machine learning training framework 125 trains the student module with perturbed knowledge from the teacher modules. A private and interpretable student module 108 may then be delivered to the model users 130.

Thus, the private and interpretable machines learning training framework 125 honors the trust concerns between multiple parties, e.g., by protecting data privacy of the data providers 110 from the model users 130. To protect the sensitive private data 105, the private and interpretable machines learning training framework 125 deploys the private knowledge transfer based on knowledge distillation with perturbation, e.g., see perturbed knowledge 103.

In addition, compared with a sample-by-sample query training in existing systems, the private and interpretable machines learning training framework 125 obtains perturbed knowledge 103 from the data providers 110 in a batch-by-batch query manner, which reduces the number of queries that are sent to the teacher modules. The batch loss generated based on a batch of sample queries by each teacher module, instead of a per-query loss, further reduces the chance of recovering private knowledge of the teacher modules at the student module, and thus data privacy of the data providers 110 is further protected.

Figure 2:
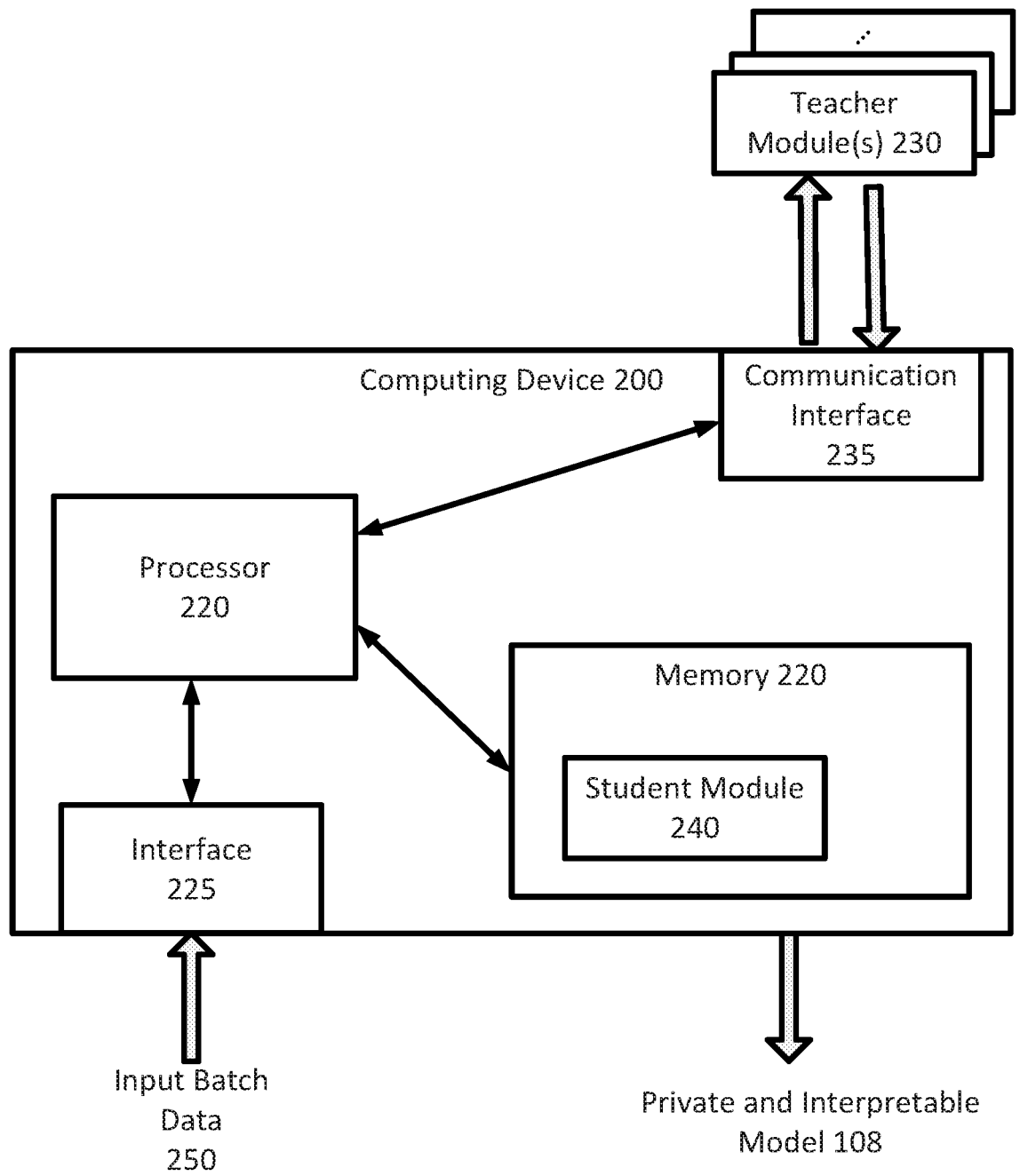
FIG. 2 is a simplified diagram of a computing device implementing the private and interpretable machines learning training framework, according to some embodiments.

FIG. 2 is a simplified diagram of a computing device 200 implementing the private and interpretable machine learning training framework 125, according to some embodiments. As shown in FIG. 2, computing device 200 includes a processor 210 coupled to memory 220. Operation of computing device 200 is controlled by processor 210. And although computing device 200 is shown with only one processor 210, it is understood that processor 210 may be representative of one or more central processing units, multi-core processors, microprocessors, microcontrollers, digital signal processors, field programmable gate arrays (FPGAs), application specific integrated circuits (ASICs), graphics processing units (GPUs), tensor processing units (TPUs), and/or the like in computing device 200. Computing device 200 may be implemented as a stand-alone subsystem, as a board added to a computing device, and/or as a virtual machine.

Memory 220 may be used to store software executed by computing device 200 and/or one or more data structures used during operation of computing device 200. Memory 220 may include one or more types of machine readable media. Some common forms of machine readable media may include floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Processor 210 and/or memory 220 may be arranged in any suitable physical arrangement. In some embodiments, processor 210 and/or memory 220 may be implemented on a same board, in a same package (e.g., system-in-package), on a same chip (e.g., system-on-chip), and/or the like. In some embodiments, processor 210 and/or memory 220 may include distributed, virtualized, and/or containerized computing resources. Consistent with such embodiments, processor 210 and/or memory 220 may be located in one or more data centers and/or cloud computing facilities.

Computing device 200 further includes a communication interface 235 that is operable to receive and transmit data to one or more other computing devices, such as the data providers 110. In some examples, data may be sent to or received from the teacher modules 230 at the data providers 110 via the communication interface 235. In some examples, each of the one or more teacher modules 230 may be used to receive one or more queries and generate a corresponding result. In some examples, each of the one or more teacher modules 230 may also handle the iterative training and/or evaluation of its respective teacher module 230 as is described in further detail below. In some examples, each of the one or more teacher modules 230 may include a machine learning structure, such as one or more neural networks, deep convolutional networks, and/or the like.

Memory 220 includes a student module 240 that may be used to implement a machine learning system and model described further herein and/or to implement any of the methods described further herein. In some examples, student module 240 may be trained based in part on perturbed knowledge 103 provided by the one or more teacher modules 230. In some examples, student module 240 may also handle the iterative training and/or evaluation of student module 240 as is described in further detail below. In some examples, student module 240 may include a machine learning structure, such as one or more neural networks, deep convolutional networks, and/or the like.

In some examples, memory 220 may include non-transitory, tangible, machine readable media that includes executable code that when run by one or more processors (e.g., processor 210) may cause the one or more processors to perform the methods described in further detail herein. In some examples, each of the teacher modules 230 and/or student module 240 may be implemented using hardware, software, and/or a combination of hardware and software. As shown, computing device 200 receives an input batch of training data 250 (e.g., from a public dataset), and generates a private and interpretable model 108, e.g., for model user 130.

As discussed above and further emphasized here, FIG. 2 is merely an example which should not unduly limit the scope of the claims. One of ordinary skill in the art would recognize many variations, alternatives, and modifications. According to some embodiments, one or more of the one or more teacher modules 230 may be located in one or more computing devices separate from computing device 200. In some examples, the separate computing devices may be consistent with computing device 200. In some examples, each of the one or more teacher modules 230 may be located in its own separate computing device.

Figure 3A:
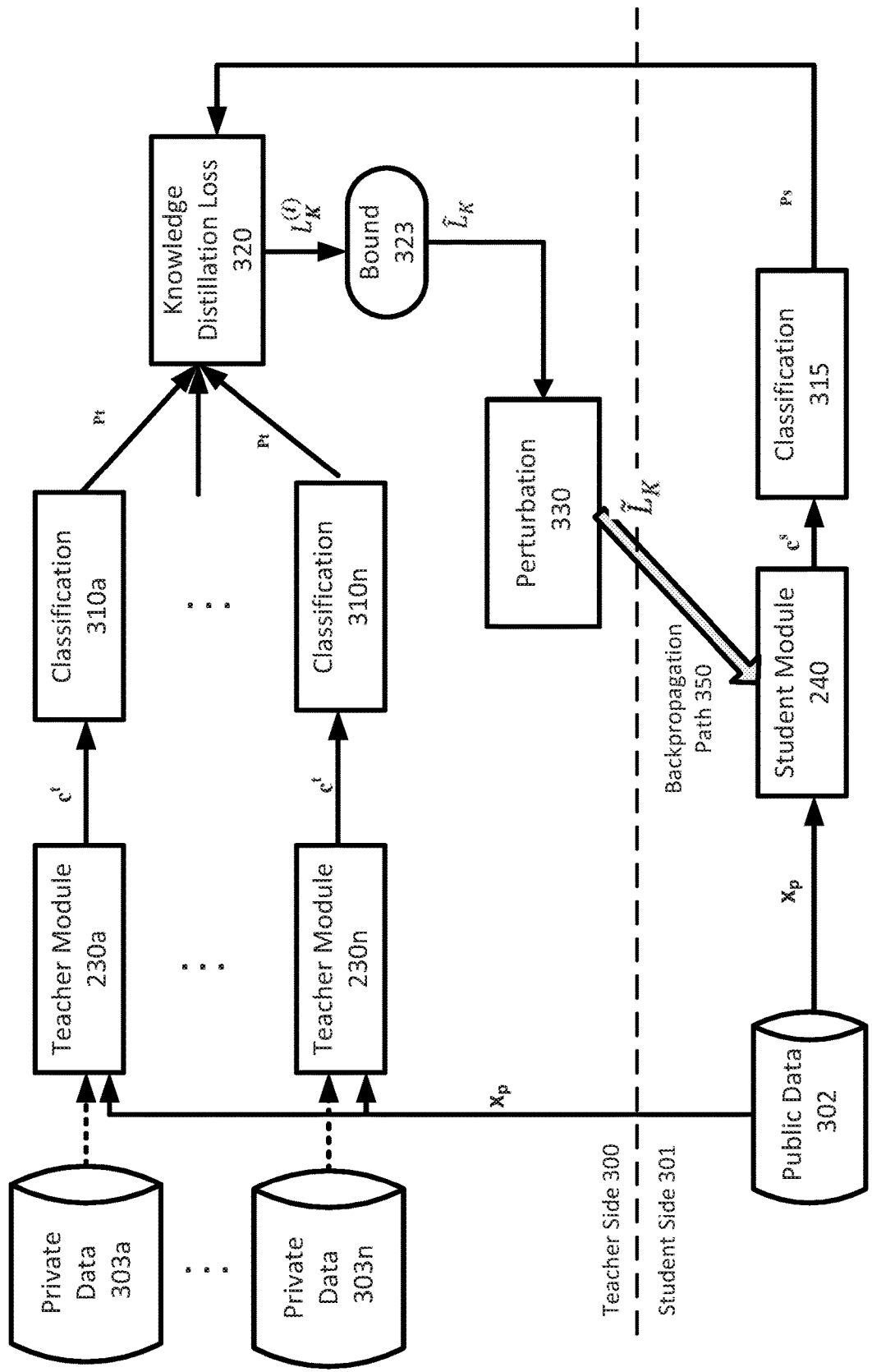
FIG. 3A is a simplified diagram illustrating a structure of knowledge distillation for private knowledge transfer from the teacher modules to the student module with perturbation by random noises that are consistent with differential privacy, according to some embodiments.
Figure 3B:
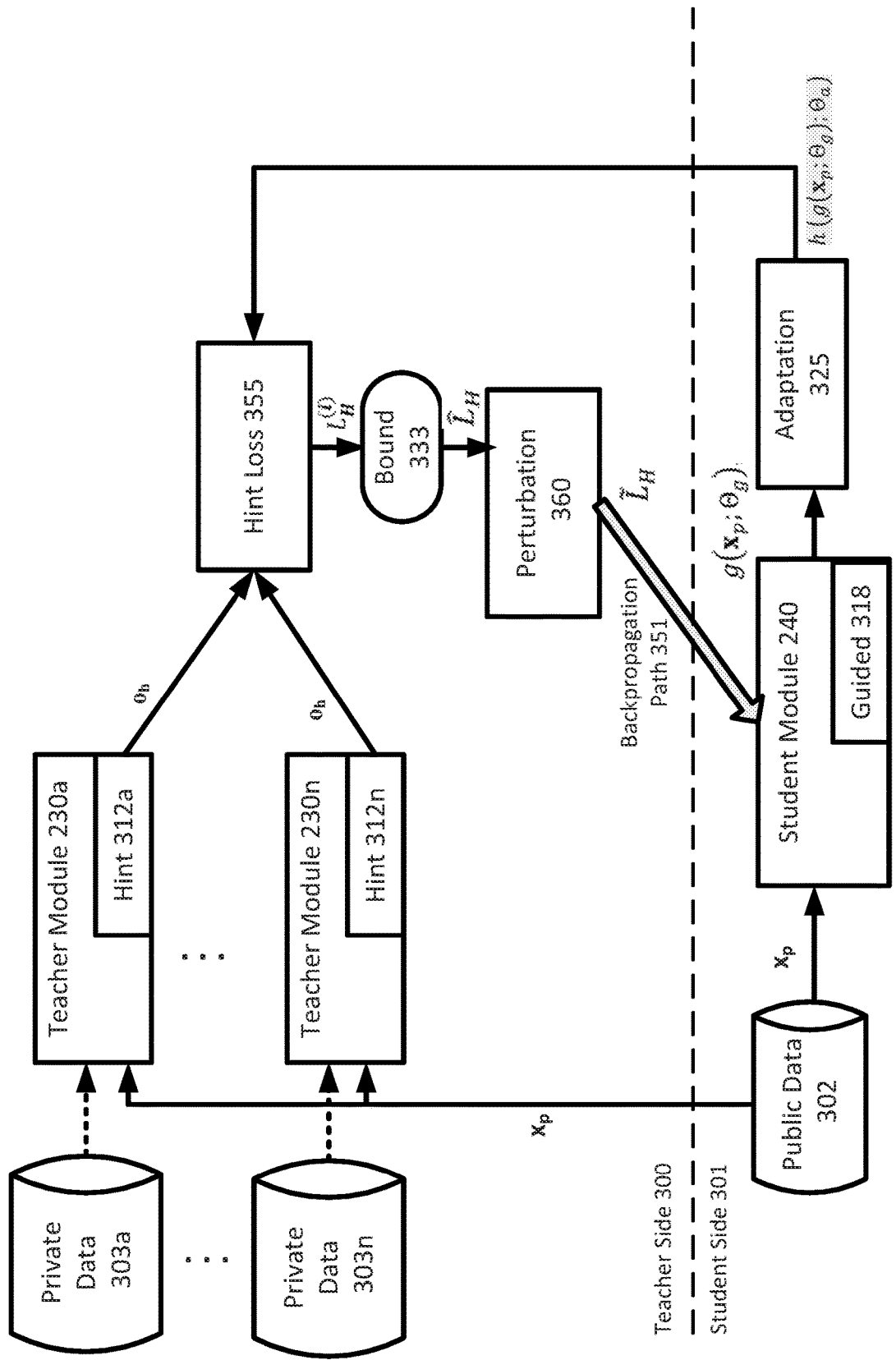
FIG. 3B is a simplified diagram illustrating a structure of hint learning to accelerate the training of the student module with perturbed knowledge from the teacher modules, according to some embodiments.
Figure 3C:
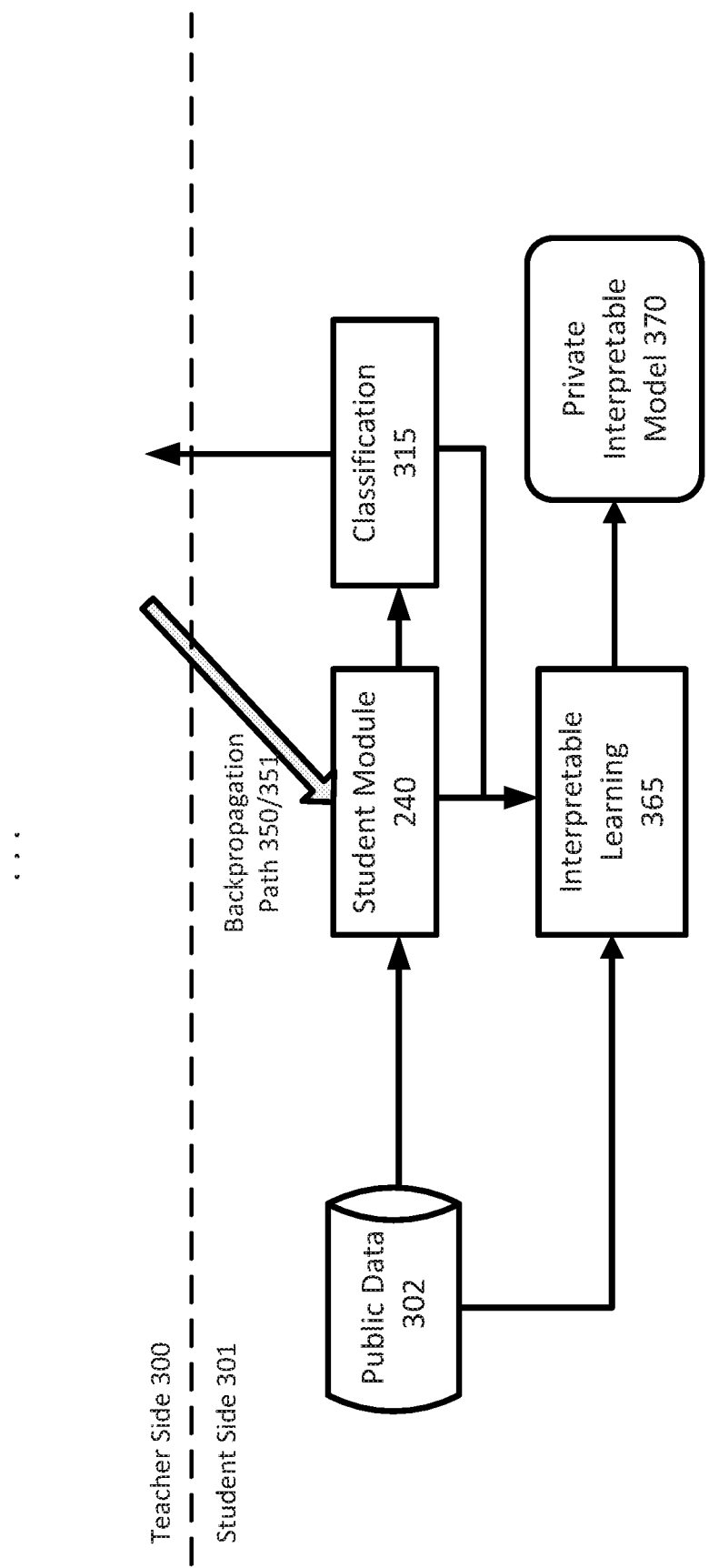
FIG. 3C is a simplified diagram illustrating a structure of interpretable learning to generate a private and human interpretable model for the model user, according to some embodiments.

FIGS. 3A-3C are simplified diagrams illustrating the structure of the private and interpretable machine learning training framework 125, according to some embodiments. In FIGS. 3A-3B, the private data sources 303$a$-$n$ and teacher modules 230$a$-$n$ may be hosted outside the model provider 120, e.g., at the data provider(s) 110.

FIG. 3A is a simplified diagram illustrating a structure of knowledge distillation for private knowledge transfer from the teacher modules 230$a$-$n$ to the student module 240 with perturbation by random noises that are consistent with differential privacy. Specifically, each teacher module 230$a$-$n$ is trained with their respective private data source 303$a$-$n$.

To utilize the teacher modules 230a-n to train the student module 240, a batch of public data samples $x_p$ is sent from the public data source 302 to the teacher modules 230a-n, each of which generates a respective output. Let $c_i^t$ denote the output of the last hidden layer of the i-th teacher module, and the output $c_i^t$ is sent to a respective classification module 310a-n. In some examples, each classification module 310a-n then generates a softmax probability according to Equation (1):

$$P_i^t = \text{softmax}(c_i^t/\tau) \qquad \text{Eq. (1)}$$

where $P_i^t$ denotes a vector of probabilities corresponding to different classes, and $\tau$ is the temperature parameter (e.g., $\tau=1$, etc.). When $\tau>1$, the probabilities of the classes whose normal values are near zero may be increased. Thus, the relationship between various classes is embodied as knowledge in the classification output, e.g., the soften probability $P_i^t$. In some examples, the classification modules 310a-n are one example type of the teacher modules, and the teacher modules 230a-n may be any other models.

In some examples, the model provider 120 may receive and aggregate the classification output $P_i^t$ from all classification modules 310a-n as classification output according to Equation (2):

$$P^t = \frac{1}{N}\sum_{i=1}^{N}P_i^t \qquad \text{Eq. (2)}$$

where N is the number of teacher modules. To learn the aggregated knowledge, the student module 240 is trained to minimize the difference between its own classification output and the aggregated classification output $P^t$ from the teacher modules, e.g., the knowledge distillation loss. At the knowledge distillation loss module 320, the knowledge distillation loss $L_k$ is calculated according to Equation (3):

$$L_K(X_p, P^t; \Theta_s) = C(P^s, P^t, \Theta_s) \qquad \text{Eq. (3)}$$

where $\Theta_s$ is the student module trainable parameters; $P_s$ denotes the classification output from the student modules 240 over the same public samples $x_p$; and C( ) denotes the cross-entropy loss, e.g., $C(P^s, P^t, \Theta_s) = -\sum_{y \in Y} P^s(y) \log(P^t(y))$, denotes the classification label. Specifically, the same public samples $x_p$ from the public data source 302 is sent to the student module 240, and the output $c^s$ of the last hidden layer of the student module 240 is sent to the classification module 315 to generate the classification output $P_s = \text{softmax}(c^s)$. The classification output $P_s$ is in turn fed to the knowledge distillation loss module 320.

As any information related to teacher modules 230a-n, e.g., data, outputs, loss or gradients, is sensitive and would raise the privacy concerns of data providers 110, no such information is passed from the teacher side 300 to the student side 301 for training without data protection. Specifically, original sensitive teacher module information, such as the knowledge distillation loss $L_k$ is perturbed by adding random noise during the training process of the student module 240. In this case, the student would learn the knowledge from its teachers with privacy guarantee.

In some examples, instead of computing an aggregated distillation loss as shown in Equation (3), the knowledge distillation loss module 320 may compute a distillation loss for each teacher module (ith teacher module) according to Equation (4):

$$L_K^{(i)}(X_p, P_i^t; \Theta_s) = C(P^s, P_i^t, \Theta_s)) \qquad \text{Eq. (4)}$$

The bound module 323 then bounds each batch loss $L_K^{(i)}$ for the ith teacher module by a threshold D. In this way, the sensitivity of the aggregated batch loss can be controlled. Specifically, the max value of $\|L_K^{(i)}\|_2$ is controlled within a given bound D. If $\|L_K^{(i)}\|_2 > D$, the value of $\|L_K^{(i)}\|_2$ is scaled down as Equation (5):

$$\overline{L}_K^{(i)} \leftarrow L_K^{(i)} \max\left(1, \frac{\|L_K^{(i)}\|_2}{D}\right) \qquad \text{Eq. (5)}$$

Otherwise, $\|L_K^{(i)}\|_2$ maintains its the original value. After bounding at the bounding module 323, the sensitivity of the bounded batch loss $\overline{L}_K^{(i)}$ for each teacher is bounded as D, which can be a configurable preset value. In some example, the bounding threshold D may be set as a different value for different teachers.

When the threshold D is set too large, the batch loss will be perturbed by excessive noise. On the other hand, when the bounding threshold D is too small, the batch loss may be over-clipped and lose its accuracy. In order to resolve this dilemma, an auxiliary teacher module may be trained to generate an adaptive norm bound D. The auxiliary teacher module is trained by semi-supervised learning based on the public data from the public data source 302. The auxiliary batch loss between the student module 240 and the auxiliary teacher may be constantly monitored to set norm bound D as the average value of the auxiliary batch loss over a period of time. In this manner, the norm bound D may be dynamically adjusted during training.

The perturbation module 330 then receives a set of bounded batch losses $\overline{L}_K^{(i)}$, i=1, ..., N, N, and computes an aggregated batch loss over all teachers by taking the average or $\overline{L}_K^{(i)}$, e.g., $$\hat{L}_K = \frac{1}{N}\sum_{i=1}^{N}\overline{L}_K^{(i)}.$$

The perturbation module 330 then adds Gaussian noise into the aggregated batch loss $\hat{L}_K$ to preserve privacy of the sensitive data from the teacher modules 230a-n according to Equation (6):

$$\tilde{L}_K \leftarrow \hat{L}_K + N(0, \sigma^2 D^3 I) \qquad \text{Eq. (6)}$$

where $\tilde{L}_K$ denotes the perturbed aggregated batch loss, and $N(0, \sigma^2 D^2 I)$ denotes a Gaussian distribution with a norm of 0 and a variance of $\sigma^2 D^2 \sigma$ a is a parameter that is indicative of the privacy loss budget of the training process.

In some examples, the aggregated batch loss $L_k$ may be perturbed with the Gaussian noise $N(0, \sigma^2 D^2 I)$ directly, e.g., with or without being bounded by the threshold D according to Equation (5).

The perturbed aggregated batch loss $\tilde{L}_K$ is then sent to the student module 240 via the backpropagation path 350 to update the parameters $\Theta_s$ of the student module 240.

FIG. 3B is a simplified diagram illustrating a structure of hint learning to accelerate the training of the student module 240 with perturbed knowledge from the teacher modules 230a-n. In some examples, a student model may take a long time to train via the knowledge distillation structure shown in FIG. 3A. In order to accelerate the convergence of the student module 240, compression training may be used to train a compact student module with a relatively smaller computation cost. However, compressing the student module 240 would affect the performance of the student module

240 based on knowledge distillation. To maintain the performance of the student module 240, a hint learning structure shown in FIG. 3B may be applied jointly to the knowledge distillation structured shown in FIG. 3A for fast convergence of the student training.

For many machine learning techniques, in addition to the distribution of prediction results from FIG. 3A, intermediate representations of the model, such as the hidden layer of the neural network or low-rank representations on the original dataset, may contain valuable information. Thus, the intermediate representations of the teacher modules 230*a-n* may be used to guide the training of the student module 240 as a hint. Analogously, the intermediate outputs of the student module 240 are trained to imitate the corresponding intermediate representations of the teacher modules 230*a-n*.

Specifically, a batch of public data samples $x_p$ is sent from the public data source 302 to the teacher modules 230*a-n*. The hint modules 312*a-n* in each of the teacher modules 230*a-n* generate a hint output $o_h$, respectively. The hint output $O_h$ from each of the hint modules 312*a-n* may represent intermediate information of the teacher modules 230*a-n*, respectively. The same batch of public data samples $x_p$ is sent from the public data source 302 to the student module 240. The guided layer 318 at the student module 240 generates a guided intermediate output $g(x_p; \Theta_g)$, where $g(.; \Theta_g)$ represents the student model up to the guided intermediate layer with parameter $\Theta_g$. The student intermediate output is then sent to the adaptation layer 325 which is configured to learn information from different formatting representations, as the guided intermediate outputs $g(x_p; \Theta_g)$ of the student module 240 may not have the same dimensional representations as the hint intermediate outputs $o_h$ of the teacher modules 230*a-n*. The adaptation layer 325 may be denoted by $h(.; \Theta_a)$ with parameter $\Theta_a$. Thus, the hint loss module 355 receives the hint outputs from the teacher modules 230*a-n*, the adapted outputs from the adaptation layer 325, and computes a hint loss under L2 norm according to Equation (7):

$$L_H(x_p, o_h; \Theta_g, \Theta_a) = \tfrac{1}{2}\|h(g(x_p; \Theta_g); \Theta_a) - o_h\|^2 \qquad \text{Eq. (7)}$$

In some examples, the hint loss module 355 computes a hint loss $L_H^{(i)}$, $i=1, \ldots N$, for each teacher module 230*a-n* according to Eq. (7) and sends the computed hint losses to the bound module 333 for bounding. In some examples, the hint loss module 355 computes and outputs an aggregated hint loss for all teacher modules by taking the average of the hint losses of all teacher modules 230*a-n* to the perturbation module 360. The bounding module 333 may be optional.

In some examples, the bounding module 333 (which may be similar to the bounding module 323) bounds each hint loss $L_H^{(i)}$ according to Equation (5). The threshold D that is used to bound the hint loss $L_H^{(i)}$ may be different from, or the same as the threshold that is used to bound the knowledge distillation loss $L_K^{(i)}$ used in Equation (5).

The bounded hint losses $\overline{L}_H^{(i)}$ are then aggregated by taking an average of all $\overline{L}_H^{(i)}$ to obtain an aggregated bounded hint loss, e.g., $$\hat{L}_H = \frac{1}{N} \sum_{i=1}^{N} \overline{L}_H^{(i)}.$$

The perturbation module 360 (which may be similar to the perturbation module 330) then adds Gaussian noise into the aggregated hint loss $\hat{L}_H$ to preserve privacy of the sensitive data from all teacher modules 230*a-n* according to an equation similar to Equation (6).

The perturbed aggregated batch loss $\tilde{L}_H$ is then sent to the student module 240 via the backpropagation path 351 to update the parameters $\Theta_g$ of the student module $g(.; \Theta_g)$ up to the guided layer 318 and the parameters $\Theta_a$ of the adaptation layer 325 $h(.; \Theta_a)$.

Because the training data of the teacher modules 230*a-n* are disjoint with each other, after bounding, the sensitivity of the aggregated bounded knowledge distillation loss $\tilde{L}_K$ or the aggregated bounded distillation loss $\tilde{L}_H$ is D/N. Thus, each query approximated by the knowledge distillation structure shown in FIG. 3A or the hint learning structure shown in FIG. 3B is ($\varepsilon$, $\delta$)-differentially private when $\sigma$ is set as $$\sqrt{2\ln\left(\frac{1.25}{\delta}\right)} / (N\varepsilon).$$

Specifically, if T denotes the number of total batches of queries sent to the teacher modules 230*a-n* from the public data source 302, for constants $\delta > 0$, $\varepsilon < \alpha_1 T$, where $a_i$ is a constant, the overall privacy loss is ($\varepsilon$, $\delta$) using moments accountant, when a is set according to Equation (8):

$$\sigma \geq a_2 \frac{\sqrt{T\ln(1/\delta)}}{N_\varepsilon} \qquad \text{Eq. (8)}$$

where T 32 $(T_h+T_d)|x_p|/S$ with $T_h$ represents the total number of learning epochs for hint learning, $T_d$ represents the total number of learning epochs for knowledge distillation learning, and S representing the batch size. Further discussion on privacy tracking using moments accountant can be found in "Deep Learning With Differential Privacy" by Abadi et al., pp. 308-318, Proceedings of the 2016 ACM SIGSAC Conference on Computer and Communications Security, 2016, which is hereby expressly incorporated by reference herein in its entirety.

In some examples, the structure described in FIG. 3B may be co-installed with the structure described in FIG. 3A. In this way, hint learning may be concurrently implemented with knowledge distillation for fast convergence of the student module 240. In some examples, the updated parameters $\Theta_a$ and $\Theta_g$ may be viewed as a subset of the parameters $\Theta_s$ for the student module 240. Thus, the hint learning may be implemented before, or concurrently with knowledge distillation to update the student module parameters for fast convergence.

FIG. 3C is a simplified diagram illustrating a structure of interpretable learning to generate a private and human interpretable model 370 (similar to the model 108 in FIG. 1) for model users 130, according to some embodiments. Specifically, the student module 240 with parameters $\Theta_s$ updated via backpropagation paths 350 and/or 351 utilizes an interpretability approach of providing interpretations for the student model. For example, in addition to providing a result in response to an input (e.g., a classification label in response to an input of a natural language text, an image, etc.), the output from the student module 240 is augmented by human understandable interpretations such as the superpixels of an image or keywords in a sentence that provide a context for the specific output. The interpretable learning module 365 may be represented by Equation (8):

$$L = \text{Iterpretable\_learning}(\Theta_s, x_p) \qquad \text{Eq. (8)}$$

where L represents the human understandable interpretation such as super-pixels or keywords, etc, and Interpretable_learning( ) may be a general model-agnostic approach to interpret the outputs of the student module 240. An example Interpretable_learning( ) can be found in "Why should I trust you?: Explaining the predictions of any classifier" by Ribeiro et al., pp. 1135-1144. Proceedings of the 22nd ACM SIGKDD International Conference On Knowledge Discovery And Data Mining, 2016, which is hereby expressly incorporated by reference herein in its entirety.

In some examples, in order to interpret a sample x, the interpretable learning module 365 transforms x into a binary interpretable version denoted by x'. The interpretable learning module 365 then generates M samples close to x' and obtains the model predictions of the M generated samples from the student module 240. A number of L features are selected from the model predictions from the M samples as the explanations for sample x. To interpret the student module 240 as a model instead of a single instance, the interpretable learning module 365 may adopt a sub-modular pick algorithm for selecting the most representative instances which can cover different features. Further details of the sub-modular pick algorithm can be found in Ribeiro et al.

Figure 4:
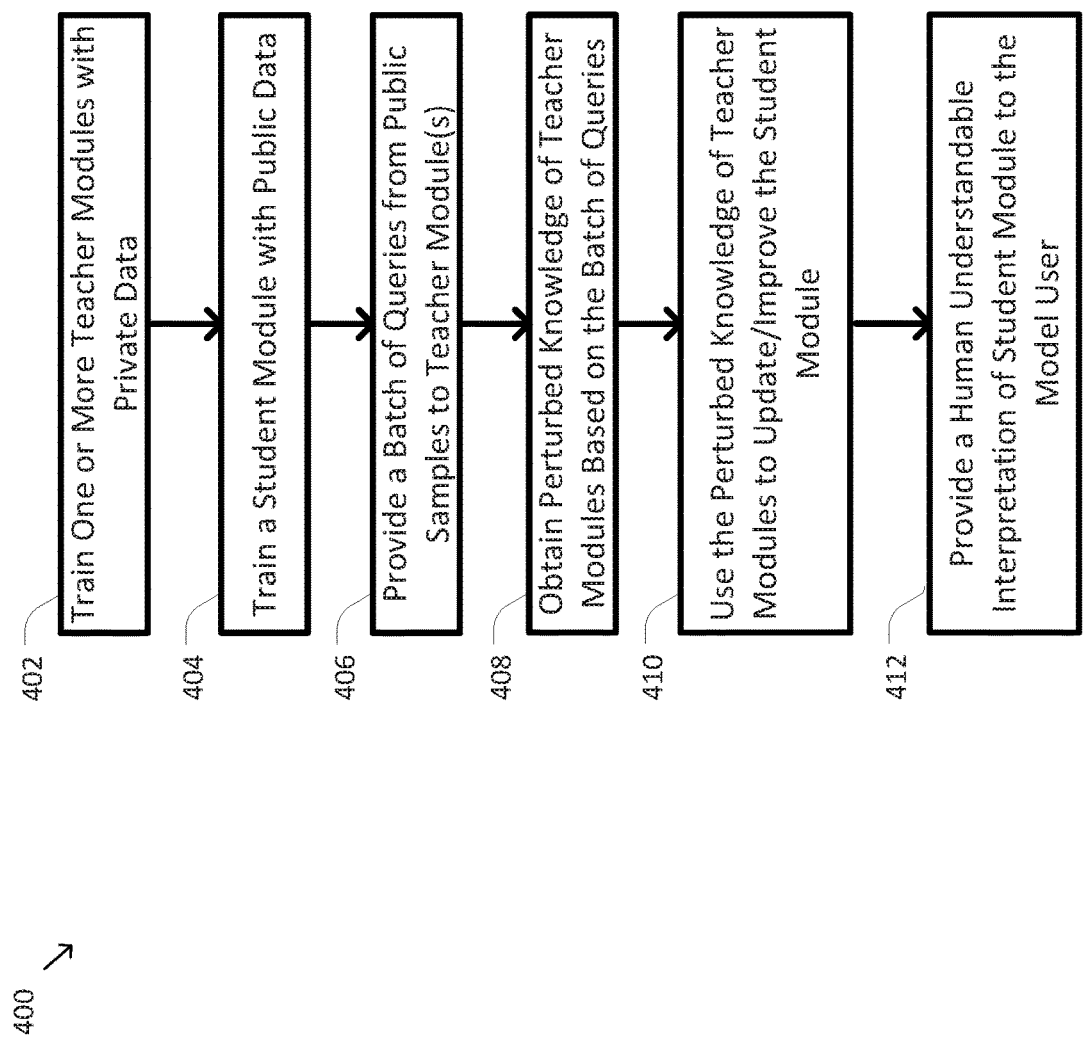
FIG. 4 is a simplified logic flow diagram of a method for training the private and interpretable model, according to some embodiments.

FIG. 4 is a simplified logic flow diagram of a method 400 for training the private and interpretable model 108, according to some embodiments. One or more of the processes 402-412 of method 400 may be implemented, at least in part, in the form of executable code stored on non-transitory, tangible, machine-readable media that when run by one or more processors (e.g., processor 210) may cause the one or more processors to perform one or more of the processes 402-412. In some embodiments, method 400 may correspond to the methods used by the model provider 120 to interact with one or more teacher modules 230a-n to train the student module 240.

At a process 402, one or more teacher modules (e.g., see teacher modules 230a-n in FIGS. 3A-3B) are trained using private data from private data sources (e.g., see 303a-n in FIGS. 3A-3B). In some examples, each of the one or more teacher modules may be trained using a respective private data set that may be different from the private data sets used by one or more of the other teacher modules. In this way, the one or more teacher modules may keep private data from each other. In some examples, each of the one or more teacher modules may be trained using backpropagation, stochastic gradient descent techniques, and/or the like based on a private dataset.

At a process 404, a student module (e.g., student module 240 in FIGS. 3A-3C) is trained with public data (e.g., public data source 302 in FIGS. 3A-3C). In some examples, the public data may be accessible by one or more parties implementing the teacher modules and/or the student module. In some examples, the public data may be different from, or partially or fully overlap with one or more of the private datasets used to train the one or more teacher modules. In some examples, the student module may be trained using back propagation, stochastic gradient descent techniques, and/or the like, e.g., to obtain an initial set of parameters.

At a process 406, a batch of queries from the public data is sent to the one or more teacher modules. In some examples, the batch of queries may be similar to the public data samples $x_p$ described in relation to FIGS. 3A-3C. In some examples, a model provider (e.g., model provider 120 in FIG. 1) may cause the batch of queries to be sent to the teacher modules via an application programming interface (API), and/or the like.

At process 408, perturbed knowledge of teacher modules is obtained based on the batch of queries. In some examples, the perturbed knowledge may include a perturbed knowledge distillation batch loss $\hat{L}_K$ generated at the perturbation module 330 in FIG. 3A, and/or a perturbed hint batch loss $\hat{L}_H$ generated at the perturbation module 360 in FIG. 3B. In some examples, the perturbed knowledge may include a perturbed output from a teacher module, e.g., when the model provider does not have trust with the data providers and thus can only obtain the perturbed outputs from teacher modules based on the batch of public samples. In some examples, the perturbed knowledge is obtained at the model provider 120 before being used to train the student module.

At a process 410, the perturbed knowledge is used to update and/or improve the student module. In some examples, the perturbed knowledge such as the perturbed knowledge distillation batch loss $\hat{L}_K$ and/or the perturbed hint batch loss $\hat{L}_H$ are used to backpropagate the student module to update the student model parameters, as discussed in relation to backpropagation paths 350-351 in FIGS. 3A-3B.

At process 412, a human understandable interpretation of the trained student module is provided to the model user. In some examples, human understandable interpretation such as super-pixels or keywords are incorporated as part of the student module to provide to the model user, as discussed in relation to the interpretable learning module 365 in FIG. 3C.

FIG. 5 is a diagram of an algorithm 500 for training a private and interpretable student model via hint learning and knowledge distillation, according to some embodiments. The algorithm 500 may be implemented, at least in part, in the form of executable code stored on non-transitory, tangible, machine-readable media that when run by one or more processors (e.g., processor 210) may cause the one or more processors to perform one or more of the processes of the algorithm 500. In some embodiments, algorithm 500 may correspond to the methods used by the model provider 120 to train a private and interpretable student model 108.

In some examples, algorithm 500 adopts a duration $T_h$ for hint training. Specifically, a hint learning process may be iteratively performed to update parameters $\Theta_a$, $\Theta_g$ of the student model from time t=1 to $T_h$. The hint learning process is further discussed in relation to FIG. 6B.

In some examples, algorithm 500 adopts a duration $T_d$ for knowledge distillation. Specifically, a knowledge distillation process may be iteratively performed to update parameters $\Theta_s$ of the student model from time t=1 to $T_d$. The knowledge distillation process is further discussed in relation to FIG. 6A.

Figure 6A:
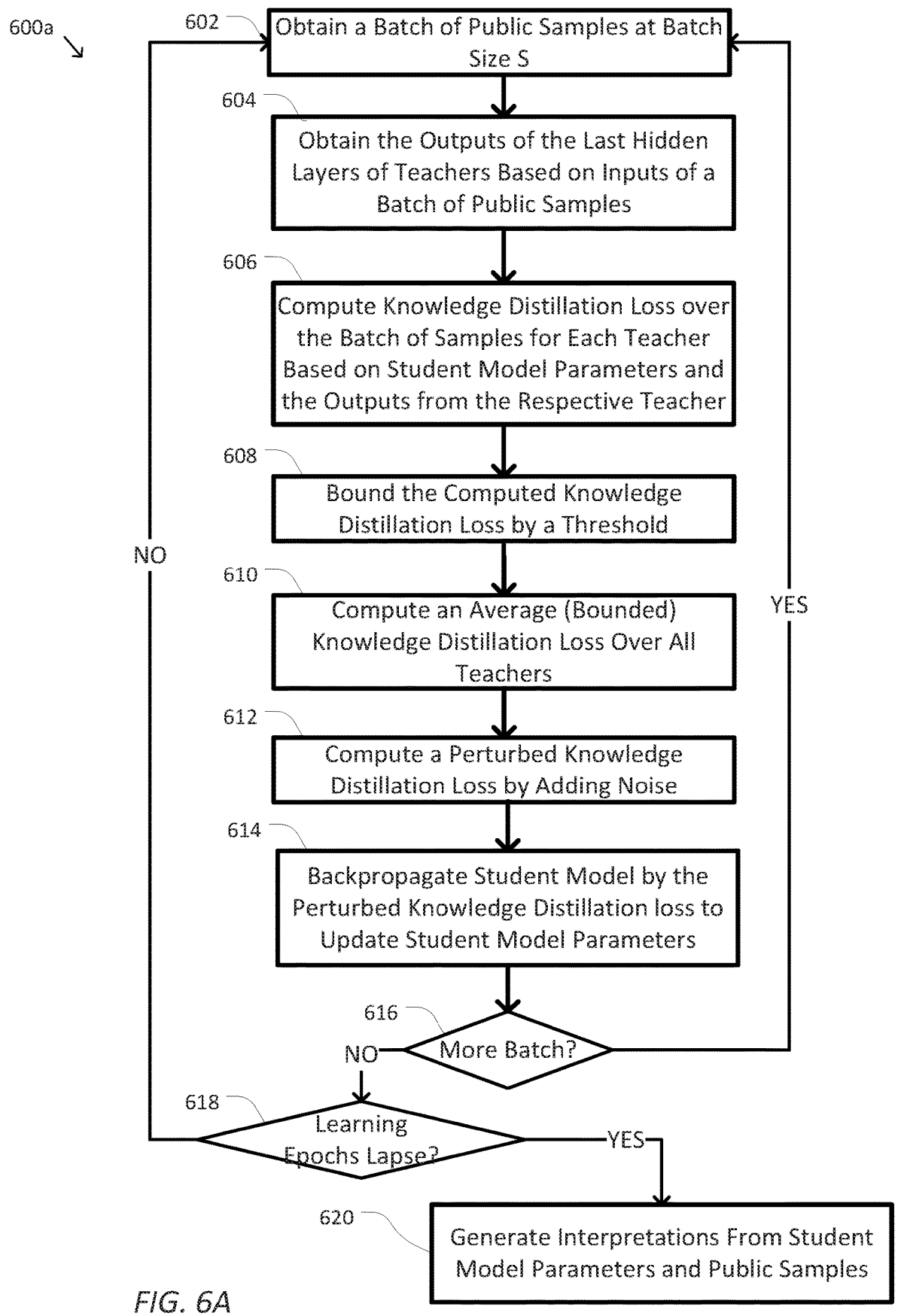
FIG. 6A is a simplified logic flow diagram illustrating a method for training the student module via knowledge distillation learning, according to some embodiments.

FIG. 6A is a simplified logic flow diagram illustrating a method 600a for training the student module 240 via knowledge distillation learning, according to some embodiments. One or more of the processes 602-620 of method 600 may be implemented, at least in part, in the form of executable code stored on non-transitory, tangible, machine-readable media that when run by one or more processors (e.g., processor 210) may cause the one or more processors to perform one or more of the processes 602-620. In some embodiments, method 600a may correspond to the methods used by the model provider 120 to train the student module 240 using perturbed knowledge from teacher modules 230a-n.

Method 600a starts at process 602, at which a batch of public samples are obtained (e.g., from public data source 302 in FIGS. 3A-3C). In some examples, the batch of public samples may have a batch size of S and may include a batch of queries.

At process 604, the outputs of the last hidden layers of each teacher modules, in response to inputs of the batch of public queries, are obtained. In some examples, the outputs may be similar to teacher module outputs $O_h$ discussed in relation to FIG. 3A.

At process 606, a knowledge distillation loss is computed for each teacher module based on student model parameters and the output from the respective teacher in response to the batch of queries, e.g., see Eq. (3).

At process 608, the computed knowledge distillation loss for each teacher module is bounded according to a pre-defined threshold, e.g., see Eq. (5).

At process 610, an average bounded knowledge distillation loss is computed by taking an average of the computed knowledge distillation losses for all teachers. In some examples, a weighted average of the computed knowledge distillation losses for all teachers may be computed, e.g., with a set of weights defined by the model provider 120 or the model user 130 with preference or emphasis on knowledge from one or more particular teacher modules.

At process 612, a perturbed knowledge loss is computed by adding noise to the average bounded knowledge distillation loss, e.g., see Eq. (6).

At process 614, the student module is backpropagated based on the perturbed knowledge loss to update the parameters of the student module, e.g., similar to $\Theta_s$ discussed in relation to FIG. 3A.

At process 616, the method 600a determines whether there are more batches of queries from public data samples for training. When there are more batches of training samples, method 600a repeats processes 602-614 to update the student model parameters using the next batch of training samples. When no more batch of training samples are available, method 600a proceeds to process 618, at which method 600a determines whether the pre-defined learning epoch $T_d$ has lapsed. When the learning epoch has lapsed, method 600a proceeds to process 620, where human understandable interpretations of the most updated student model are generated, e.g., according to Eq. (8). When the learning epoch has not lapsed, the method 600a repeats 602-616 to re-train the student model based on the available public data samples.

Figure 6B:
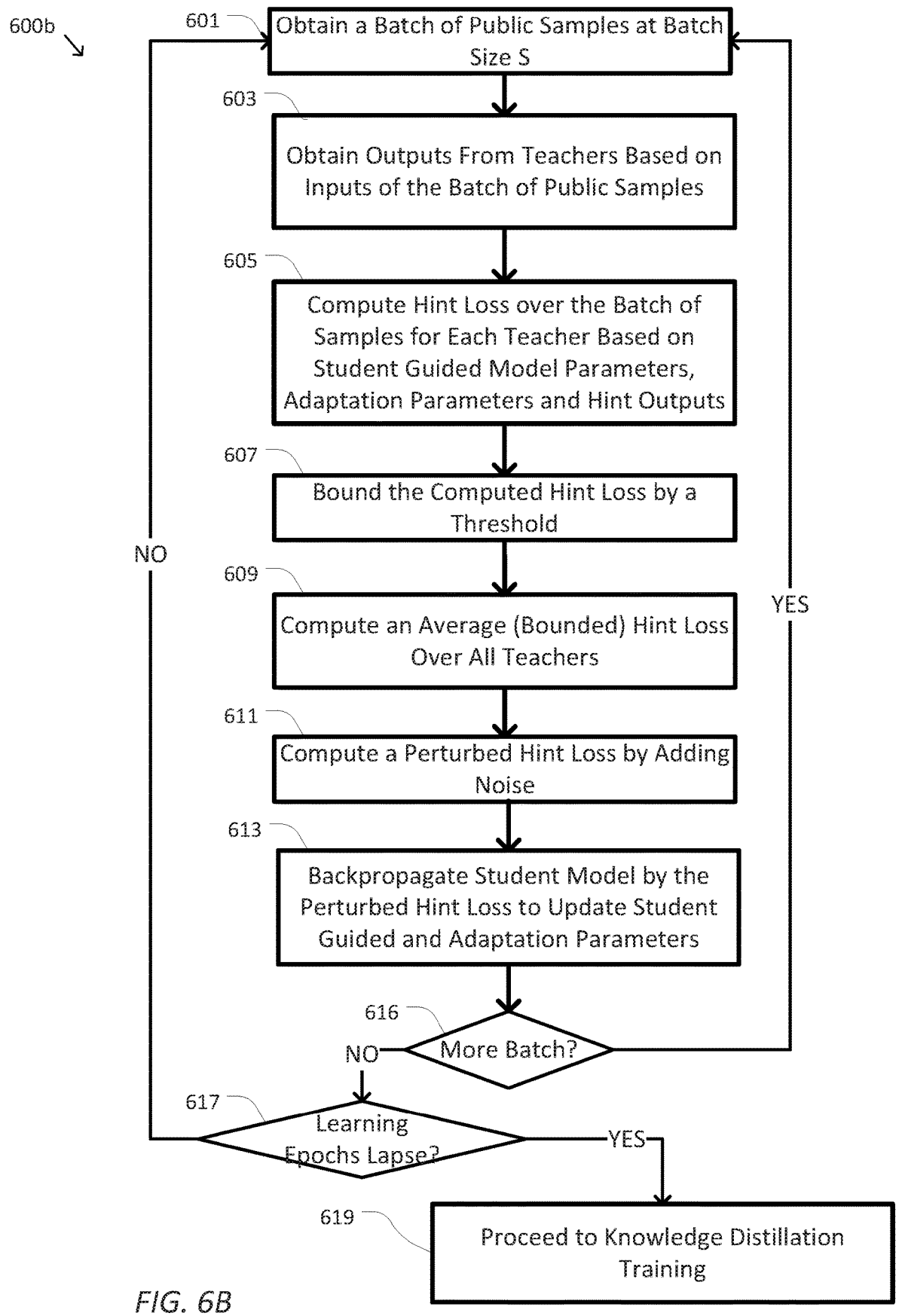
FIG. 6B is a simplified logic flow diagram illustrating a method for training the student module via hint learning, according to some embodiments.

FIG. 6B is a simplified logic flow diagram illustrating a method 600b for training the student module 240 via hint learning, according to some embodiments. One or more of the processes 601-619 of method 600b may be implemented, at least in part, in the form of executable code stored on non-transitory, tangible, machine-readable media that when run by one or more processors (e.g., processor 210) may cause the one or more processors to perform one or more of the processes 601-619. In some embodiments, method 600b may correspond to the methods used by the model provider 120 to train the student module 240 using hint learning from teacher modules 230a-n.

Method 600b starts at process 601, at which a batch of public samples are obtained, e.g., similar to process 602. In some examples, the batch of public samples may have a batch size of S that is similar to, or different from the batch size used in knowledge distillation learning at process 602.

At process 603, the hint outputs of each teacher module, in response to inputs of the batch of public sample queries, are obtained. In some examples, the outputs may be similar to teacher module outputs $O_h$ discussed in relation to FIG. 3A.

At process 605, a hint loss is computed for each teacher module based on student guided layer outputs, student guided model parameters, student adaptation layer parameters, and the output from the respective teacher in response to the batch of queries, e.g., according to Eq. (7).

At process 607, the computed hint loss for each teacher module is bounded according to a pre-defined threshold, e.g., according to Eq. (5).

At process 609, an average bounded hint loss is computed by taking an average of the computed hint losses for all teacher modules. In some examples, a weighted average of the computed hint losses for all teachers may be computed, e.g., with a set of weights defined by the model provider 120 or the model user 130 with preference or emphasis on hints from one or more particular teacher modules.

At process 611, a perturbed hint is computed by adding noise to the average bounded knowledge distillation loss, e.g., according to Eq. (6).

At process 613, the student module is backpropagated based on the perturbed hint loss to update the parameters of the student guided model and the parameters for the adaptation layer, e.g., similar to $\Theta_g$, $\Theta_a$ discussed in relation to FIG. 3B.

At process 615, the method 600b determines whether there are more batches of queries from public data samples for hint training. When there are more batches of training samples, method 600b repeats processes 601-613 to update the parameters of the student guided model and the parameters for the adaptation layer using the next batch of training samples. When no more batch of training samples are available, method 600b proceeds to process 617, at which method 600b determines whether the pre-defined learning epoch $T_H$ has lapsed. When the learning epoch has lapsed, method 600b proceeds to process 619, where method 600b proceeds with knowledge distillation learning to further update parameters of the student module, e.g., starting at process 602. When the learning epoch has not lapsed, the method 600b repeats 601-617 to re-train the student model based on the available public data samples.

As discussed in relation to FIGS. 3A-3B, hint learning may be optionally used to accelerate the convergence of the student model. Thus, method 600a of knowledge distillation learning may be engaged independently from and/or jointly with method 600b of hint learning. In some examples, method 600b of hint learning may be performed first to update the student model parameters closer to convergence, and method 600a of knowledge distillation learning may be subsequently performed to further refine the student model parameters.

Figure 7:
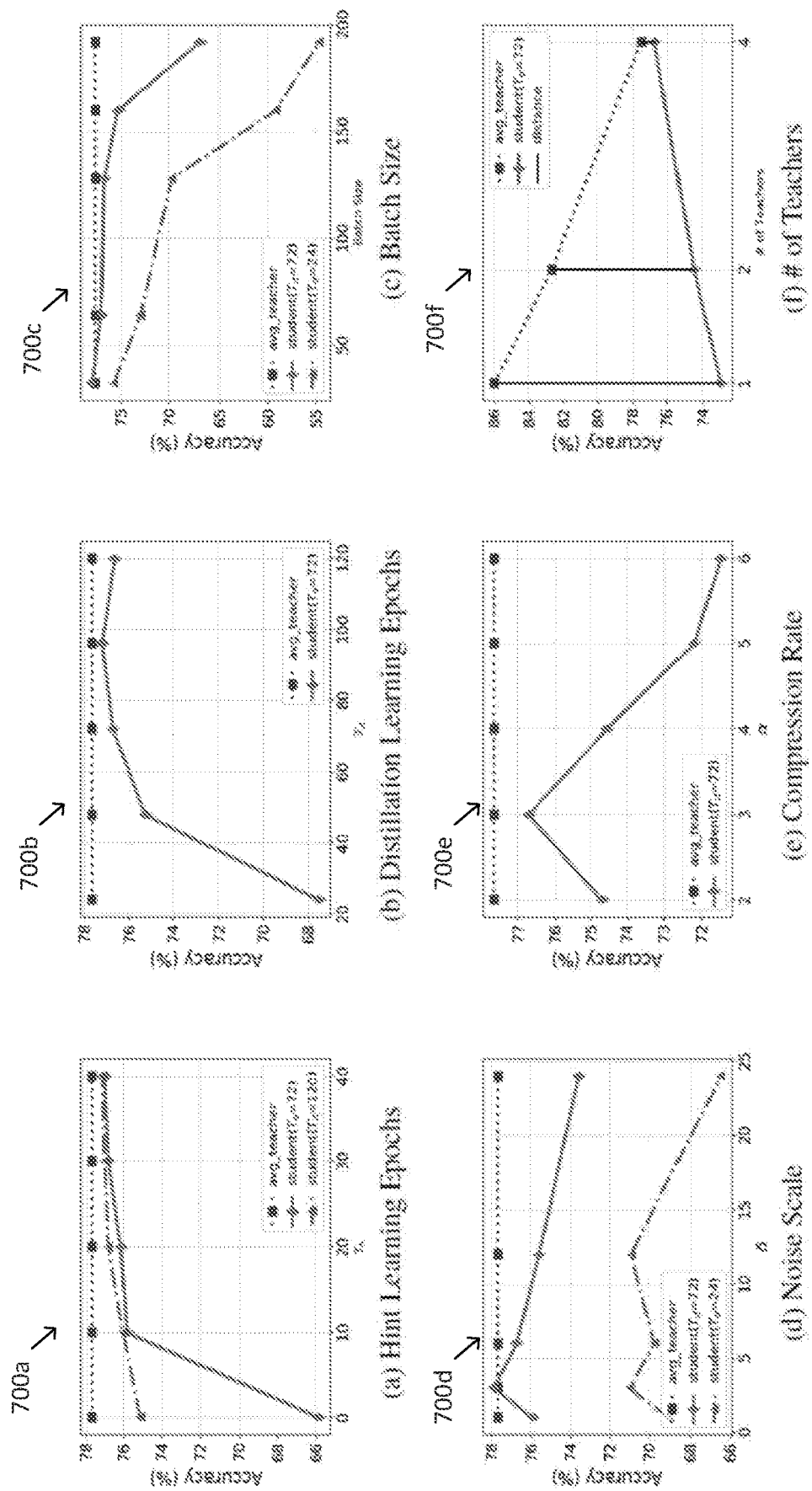
FIG. 7 is a simplified diagram showing performance charts illustrating performance impacts of various factors of the knowledge distillation learning and/or hint learning discussed in FIGS. 1-6B, according to some embodiments.

FIG. 7 is a simplified diagram showing performance charts illustrating performance impacts of various factors of the knowledge distillation learning and/or hint learning discussed in FIGS. 1-6B, according to some embodiments. The percentage of accurate predictions made by the student module or the teacher module in response to public sample queries is used as the performance metrics in charts 700a-f.

Chart 700a shows the impact of various hint learning epochs $T_h$ on the accuracy of the student module. Specifically, without hint learning, i.e., $T_h=0$, the accuracy of student module is determined by the distillation learning. In this case, a small value of distillation learning epoch $T_d$ significantly deteriorates the student module performance. However, this performance degradation may be mitigated by the hint learning, even with a small value of hint learning epoch $T_h$. When $T \geq 10$, the performance difference between $T_d=72$ and $T_d=120$ is negligible. Thus, it may suggest that the hint learning helps to improve the student module performance with little privacy loss. In some example, a hint learning epoch $T_h$=30 may be used to achieve satisfactory performance.

Chart 700b shows the impact of epoch $T_d$ for distillation learning on the student module performance. As shown at chart 700b, the performance of student module may be more effective when the value of distillation learning epoch $T_d$ increases, because more perturbed private knowledge is transferred from the teacher modules. In some examples, the distillation learning epoch $T_d$=72 may be used to achieve satisfactory performance.

Chart 700c shows the impact of batch size S on the student module performance. The performance of student improves with a smaller batch size S as shown in chart 700c. A large value of batch size S leads to a smaller number of batch query requests to the teacher modules, and thus the privacy of the teacher modules may be better protected. In order to balance the effectiveness and the privacy protection, in some examples, the batch size may be set as 128.

Chart 700d shows the impact of perturbation noise scale on the student module performance. A larger noise scale may help to protect the data privacy, but also reduces the student module performance in general. However, as the norm bound and additional perturbation noise may act as regularization roles during training, a relatively large value of noise scale may be used for privacy preserving.

Chart 700e shows the impact of compression rate on the student module performance. The student module performance may improve with a larger size of the neural network that the student module is built on. Student module with a very large size of neural network, however, requires more public data and more queries for a stable and effect model.

Chart 700f shows the impact of the number of teachers on the student module performance. The performance of the student is also shown with different teacher modules. In some examples, when a total of 40,000 sensitive data samples are used, the sensitive data samples may be split to train the teacher modules based on the number of teachers, such as one teacher with 40,000 samples, two teachers trained with 20,000 samples for each, and four teachers trained with 10,000 samples. The performance of the teacher module may increase with more training samples, but the student module performance may improve when trained with more teacher modules.

Figure 8:
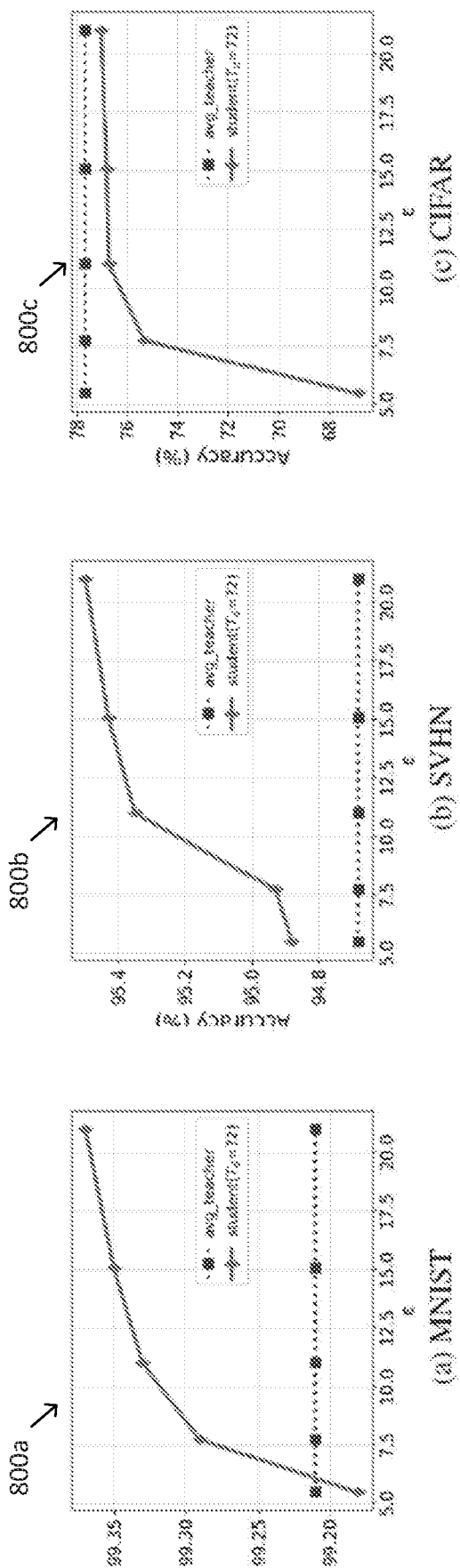
FIG. 8 is a simplified diagram showing performance charts illustrating the performance accuracy versus private loss of the student module over different public datasets, according to some embodiments.

FIG. 8 is a simplified diagram showing performance charts illustrating the performance accuracy versus private loss of the student module over different public datasets, according to some examples. Three public image datasets are used in charts 800a-c, respectively: (a) dataset MINST described in "Gradient-Based Learning Applied To Document Recognition" by LeCun et al., pp. 2278-2324, Proceedings of the IEEE, 86 (11), 1998; (b) dataset SVHN described in "Reading Digits In Natural Images With Unsupervised Feature Learning" by Netzer et al., Proceedings of the 24 th International Conference on Neural Information Processing Systems, pp. 1-9.2011; and (c) dataset CIFAR described in "Learning Multiple Layers Of Features From Tiny Images" by Krizhevsky et al., Technical Report TR-2009, University of Toronto, 2009, all of which are hereby expressly incorporated by reference herein in their entirety. Each dataset is split as five subsets. Four of the subsets are used to train four teacher models and the last one is considered as public data to train the student module.

As shown in charts 800a-c, the student module achieves accuracies of 75.57%, 95.01% and 98.68% on CIFAR MNIST and SVHN with (5.48, $10^{-5}$), (3.00, $10^{-6}$), and (2.74, $10^{-5}$) differential privacy, respectively. Charts 800a-c also show that the accuracy generally increases with a larger privacy budget. Meanwhile, the student modules may outperform the teacher modules on MNSIT and SVHN in general, and very close in performance to the teacher modules on CIFAR even with a small privacy budget.

Figure 9:
FIG. 9 is a simplified table showing the effectiveness and interpretation efficiency of the student module, according to some embodiments.

FIG. 9 is a simplified table 900 showing the effectiveness and interpretation efficiency of the student module, according to some embodiments. The student module performance is evaluated with different number of student model parameters, and the time (in seconds) used for interpretation. In these examples, the student modules S1 and S2 are tested on a super desktop equipped with Intel(R) Xeon(R) CPU E5-2620 v4@ 2.10 GHz with 16 cores central processing unit (CPU) and 82.4 GB memory, and compared with the average performance of teacher modules.

The student module outperforms the average performance of its teachers on both SVHN and MNIST datasets, and still obtain comparable performance on CIFAR. On MNIST, the interpretable student achieves 11.9×compression ratio and 0.75×speed-up on interpretation with 0.12% accuracy increase. On SVHN, the interpretable student model is also better than the teacher models on model size (3.8×compression ratio), efficiency (2.5×speed-up) and effectiveness (+0.67% accuracy). On CIFAR, the accuracy decreases less than 1% using only 39.5% times. Therefore, by applying hint learning and knowledge distillation to train the student module, the interpretable student module is effective and efficient.

Some examples of computing devices, such as computing device 100 may include non-transitory, tangible, machine readable media that include executable code that when run by one or more processors (e.g., processor 220) may cause the one or more processors to perform the processes of methods 400, 600a-b and/or Algorithm 500 of FIG. 5. Some common forms of machine readable media that may include the processes of method 400, 600a-b and/or Algorithm 500 of FIG. 5 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

This description and the accompanying drawings that illustrate inventive aspects, embodiments, implementations, or applications should not be taken as limiting. Various mechanical, compositional, structural, electrical, and operational changes may be made without departing from the spirit and scope of this description and the claims. In some instances, well-known circuits, structures, or techniques have not been shown or described in detail in order not to obscure the embodiments of this disclosure Like numbers in two or more figures represent the same or similar elements.

In this description, specific details are set forth describing some embodiments consistent with the present disclosure. Numerous specific details are set forth in order to provide a thorough understanding of the embodiments. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method of training a student module with knowledge from one or more teacher modules, the method comprising:
    generating, via the student module with a first set of parameters, a set of student outputs in response to a batch of queries;
    computing, by a processor, a loss metric comparing the set of student outputs and a set of teacher outputs that are generated via at least one teacher module using the batch of queries, wherein the at least one teacher module has been trained with a dataset not accessible to the student module;
    perturbing the loss metric with noise; and
    generating a second set of parameters for an updated student module based on the perturbed loss metric.

2. The method of claim 1, wherein the at least one teacher module is trained with a set of private data samples inaccessible to the student module.

3. The method of claim 1, further comprising:
    causing the batch of queries to be sent to the at least one teacher module; and
    obtaining the set of teacher outputs from a last hidden layer of the at least one teacher module in response to an input of the batch of queries.

4. The method of claim 1, wherein computing the loss metric based on the set of student outputs and the set of teacher outputs comprises:
    computing a set of student classification outputs based on the set of student outputs;
    computing a set of teacher classification outputs based on the set of teacher outputs; and
    computing a cross-entropy loss between the set of student classification outputs and the set of teacher classification outputs.

5. The method of claim 1, wherein perturbing the loss metric with noise comprises:
    bounding each loss metric computed corresponding to each teacher module with a pre-defined threshold;
    computing an average of the bounded loss metrics for all teacher modules; and
    adding a perturbation noise to the computed average of the bounded loss metrics.

6. The method of claim 5, wherein adding the perturbation noise to the computed average of the bounded loss metrics comprises:
    generating a Gaussian noise having a zero mean and a variance based on a private budget parameter and the pre-defined threshold.

7. The method of claim 1, wherein generating the second set of parameters for an updated student module based on the perturbed loss metric comprises:
    using backpropagation on the student module by the perturbed loss metric to obtain the second set of parameters.

8. The method of claim 1, further comprising using hint learning with the at least one teacher module to update at least the subset of the first set of parameters for the student module by:
    generating a set of intermediate student outputs via a student guided layer configured with a set of student guided layer parameters in response to an input of the batch of queries; and
    generating a set of adapted intermediate student outputs via an adaptation layer configured with a set of adaptation layer parameters,
        wherein the at least the subset of the first set of parameters for the student module includes the set of student guided layer parameters and the set of adaptation layer parameters.

9. The method of claim 8, further comprising:
    computing a hint loss metric based on the set of adapted intermediate student outputs and the set of teacher outputs that is generated via at least one teacher module using the batch of queries;
    perturbing the hint loss metric with the noise; and
    using backpropagation by the perturbed hint loss metric to update the set of student guided layer parameters and the set of adaptation layer parameters.

10. The method of claim 1, further comprising:
    incorporating a interpretation module that provides a human understandable interpretation of outputs with the student module.

11. A system for data privacy protected training, the system comprising:
    one or more teacher modules for generating at least one set of teacher outputs in response to a batch of queries from a data set;
    a student module for generating a set of student outputs in response to the batch of queries;
        wherein each of the one or more teacher modules has been trained with a respective dataset not accessible to the student module;
    one or more privacy sanitization modules for perturbing, a loss metric computed comparing the set of teacher outputs and the set of student outputs, with noise and providing the perturbed loss metric to the student module; and
    wherein the student module is updated using the perturbed loss metric.

12. The system of claim 11, further comprising:
    a loss module for obtaining the set of teacher outputs from a last hidden layer of the at least one teacher module in response to an input of the batch of queries.

13. The system of claim 12, wherein the loss module is further configured for:
    computing a set of student classification outputs based on the set of student outputs;
    computing a set of teacher classification outputs based on the set of teacher outputs; and
    computing the loss metric as a cross-entropy loss between the set of student classification outputs and the set of teacher classification outputs.

14. The system of claim 11, wherein the one or more privacy sanitization modules are further configured for:
    bounding each loss metric computed corresponding to each teacher module with a pre-defined threshold;
    computing an average of the bounded loss metrics for all teacher modules; and adding a perturbation noise to the computed average of the bounded loss metrics.

15. The system of claim 14, wherein the one or more privacy sanitization modules are further configured for:
generating a Gaussian noise having a zero mean and a variance based on a private budget parameter and the pre-defined threshold.

16. The system of claim 11, wherein the student module is updated using backpropagation by the perturbed loss metric to obtain an updated set of parameters for the student module.

17. The system of claim 16, further comprising:
a hint loss module for using hint learning with the at least one teacher module to update at least a subset of the set of parameters for the student module before using the perturbed loss metric to update the student module.

18. The system of claim 17, wherein the student module is further configured for:
generating a set of intermediate student outputs via a student guided layer configured with a set of student guided layer parameters in response to an input of the batch of queries; and
generating a set of adapted intermediate student outputs via an adaptation layer configured with a set of adaptation layer parameters;
wherein the at least the subset of the set of parameters for the student module includes the set of student guided layer parameters and the set of adaptation layer parameters.

19. The system of claim 18, wherein the hint loss module is further configured for:
computing a hint loss metric based on the set of adapted intermediate student outputs and the set of teacher outputs that is generated via at least one teacher module using the batch of queries;
perturbing the hint loss metric with the noise; and
using backpropagation by the perturbed hint loss metric to update the set of student guided layer parameters and the set of adaptation layer parameters.

20. A processor-readable non-transitory storage medium storing processor-executable instructions of training a student module with perturbed knowledge from one or more teacher modules, the instructions executable by a processor to:
generate, via the student module with a first set of parameters, a set of student outputs in response to a batch of queries;
compute a loss metric comparing the set of student outputs and a set of teacher outputs that is generated via at least one teacher module using the batch of queries, wherein the at least one teacher module has been trained with a dataset not accessible to the student module;
perturb the loss metric with noise; and
generate a second set of parameters for an updated student module based on the perturbed loss metric.

* * * * *